US009609889B2

(12) United States Patent
Miyashita et al.

(10) Patent No.: US 9,609,889 B2
(45) Date of Patent: Apr. 4, 2017

(54) REFRIGERATOR AND CONTAINER FOR COLD STORAGE

(75) Inventors: Masakazu Miyashita, Kagoshima (JP); Mitsuhiko Sunadomari, Chiyoda-ku (JP)

(73) Assignee: BOSTON COM., LTD., Tokyo (JP)

( * ) Notice: Subject to any disclaimer, the term of this patent is extended or adjusted under 35 U.S.C. 154(b) by 0 days.

(21) Appl. No.: 13/040,643

(22) Filed: Mar. 4, 2011

(65) Prior Publication Data

US 2011/0271702 A1 Nov. 10, 2011

(30) Foreign Application Priority Data

May 10, 2010 (JP) ................. 2010-108845

(51) Int. Cl.
| | |
|---|---|
| F25D 27/00 | (2006.01) |
| F25D 11/00 | (2006.01) |
| A23L 3/36 | (2006.01) |
| F25D 17/04 | (2006.01) |
| A23L 3/26 | (2006.01) |
| A23B 4/015 | (2006.01) |

(Continued)

(52) U.S. Cl.
CPC ............. *A23L 3/36* (2013.01); *A23B 4/015* (2013.01); *A23B 4/066* (2013.01); *A23B 7/015* (2013.01); *A23B 7/0425* (2013.01); *A23L 3/263* (2013.01); *A23L 3/363* (2013.01); *F25D 17/042* (2013.01); *F25D 2317/0416* (2013.01)

(58) Field of Classification Search
CPC ............................. F25D 17/06; F25D 23/006
USPC ...................... 62/62, 78, 264, 410
See application file for complete search history.

(56) References Cited

U.S. PATENT DOCUMENTS 3,976,122 A * 8/1976 Neidhardt ............... A23L 3/363
165/265
5,078,971 A * 1/1992 Matuda et al. ............... 422/121
(Continued)

FOREIGN PATENT DOCUMENTS

| CN | 1955626 A | 5/2007 |
|---|---|---|
| CN | 101248323 A | 8/2008 |

(Continued)

OTHER PUBLICATIONS

Office Action issued for Chinese Patent Application No. 201010604503.1 dated Sep. 29, 2013.
(Continued)

*Primary Examiner* — Christopher R Zerphey
(74) *Attorney, Agent, or Firm* — Pillsbury Winthrop Shaw Pittman, LLP (57) ABSTRACT

An item to be preserved is chilled or frozen without causing discoloration or an offensive odor on the item. A refrigeration chamber includes: a refrigeration compartment set at a chilling temperature or a freezing temperature; a catalyst-layer forming plate provided along the wall surface of the refrigeration compartment; a catalyst layer containing a catalyst prepared by blending photocatalyst particles and metal catalyst particles with a solution of a binder and a binder adjuvant; a light source opposed to the refrigeration compartment, the light source irradiating the catalyst layer with light, and item trays disposed in the refrigeration compartment, the item trays acting as plasma plates or having plasma plates thereon, wherein the refrigeration compartment contains a counter electrode plate for the plasma plate.

1 Claim, 2 Drawing Sheets

(51) Int. Cl.
*A23B 4/06* (2006.01)
*A23B 7/015* (2006.01)
*A23B 7/04* (2006.01)

(56) References Cited

U.S. PATENT DOCUMENTS

| | | | | |
|---|---|---|---|---|
| 6,139,803 | A | * | 10/2000 | Watanabe et al. ............ 422/121 |
| 6,238,630 | B1 | * | 5/2001 | Iimura ........................ 422/186.3 |
| 7,056,476 | B2 | * | 6/2006 | Okada et al. ................. 422/121 |
| 7,237,400 | B2 | * | 7/2007 | Owada ............................ 62/264 |
| 2003/0084676 | A1 | * | 5/2003 | Thurman ......................... 62/256 |
| 2003/0230104 | A1 | * | 12/2003 | Morse .............................. 62/277 |
| 2004/0007000 | A1 | * | 1/2004 | Takeda et al. ..................... 62/78 |
| 2004/0037736 | A1 | * | 2/2004 | Perruchot et al. .............. 422/22 |
| 2006/0112699 | A1 | * | 6/2006 | Sato et al. ......................... 62/78 |
| 2008/0056938 | A1 | * | 3/2008 | Han et al. ........................ 422/22 |
| 2008/0236183 | A1 | * | 10/2008 | Iimura ............................. 62/264 |
| 2008/0286163 | A1 | * | 11/2008 | Garfield et al. ............... 422/120 |
| 2010/0199861 | A1 | * | 8/2010 | Godai .................... A23B 4/012 99/483 |

FOREIGN PATENT DOCUMENTS

| | | |
|---|---|---|
| JP | H01202237 A | 8/1989 |
| JP | H06277021 A | 10/1994 |
| JP | H0769105 A | 3/1995 |
| JP | H1076597 A | 3/1998 |
| JP | H11137228 A | 5/1999 |
| JP | 2000295955 A | 10/2000 |
| JP | 2002286358 A | 10/2002 |
| JP | 2003088348 A | 3/2003 |
| JP | 2005-61729 | 3/2005 |
| JP | 2005233516 A | 9/2005 |
| JP | 2009186171 A | 8/2009 |

OTHER PUBLICATIONS

Office Action issued for Chinese Patent Application No. 201010604503.1 dated Apr. 21, 2014.

Office Action issued for Japanese Patent Application No. 2010-108845 dated Feb. 4, 2014.

* cited by examiner

REFRIGERATOR AND CONTAINER FOR COLD STORAGE

CROSS-REFERENCE TO RELATED APPLICATIONS

This application is based upon and claims the benefit of priority from prior Japanese Patent Application No. 2010-108845, filed May 10, 2010, the entire contents of which are incorporated herein by reference.

BACKGROUND

Field of the Invention

The present invention relates to refrigeration chambers for, e.g., refrigerators and freezers, and refrigerated item containers that accommodate items to be preserved and are used in the refrigeration chambers.

Description of the Related Art

Generally, in preservation of perishable products such as fresh foods, fresh fruits, and natural flowers, and processing foods of fresh foods, items to be preserved are placed in a refrigeration chamber of, e.g., a refrigerator and a freezer and are chilled or frozen in the chamber. Thus the chilled or frozen items are obtained from the items to be preserved and are stored in the refrigeration chamber.

Further, generally, items chilled or frozen thus are unrefrigerated or thawed in a refrigeration chamber, so that the chilled or frozen items are recovered to a state before chilling or freezing, that is, a state before the items are stored in the refrigeration chamber.

Moreover, in general, chilled or frozen items are taken out of a refrigeration chamber and are unrefrigerated or thawed by using various unrefrigerated storage means or thawing means or methods, so that the chilled or frozen items are recovered to a state before chilling or freezing, that is, a state before the items are stored in the refrigeration chamber. The present invention relates to the use of a refrigeration chamber and a refrigerated item container that accommodates items to be preserved and is used in the refrigeration chamber, and thus the detailed explanation of items unrefrigerated or thawed outside the refrigeration chamber is omitted.

In the case where an item to be preserved is chilled or frozen thus, the chilled or frozen item is stored in the refrigeration chamber, and then the chilled or frozen item in the refrigeration chamber is unrefrigerated or thawed to a state before chilling or freezing, it is difficult to effectively obtain the same quality as in a state before chilling or freezing such that the item has no or substantially no discoloration or an offensive odor.

In the case where a chilled or frozen item is unrefrigerated or thawed thus to a state before chilling or freezing, that is, a state before the item is stored in the refrigeration chamber, it is difficult to effectively obtain the same quality as in a state before the storage in the refrigeration chamber such that discoloration or an offensive odor has not developed or discoloration or an offensive odor has hardly developed since chilling or freezing.

In the related art, as described in Japanese Patent Laid-Open No. 2005-61729, in the case where an item to be preserved is chilled or frozen, the item to be preserved is disposed in an alternating magnetic field to apply microvibrations from the alternating magnetic field to the item to be preserved, so that the item to be preserved is chilled or frozen under the influence of microvibrations. Further, in the case where a chilled or frozen item is unrefrigerated or thawed, the chilled or frozen item is disposed in an alternating magnetic field to apply microvibrations from the alternating magnetic field to the chilled or frozen item as in the case of chilling or freezing, so that the chilled or frozen item is unrefrigerated or thawed under the influence of microvibrations.

Although an item to be preserved or a chilled or frozen item is activated to some extent even after being chilled or frozen thus or unrefrigerated or thawed thus, it is quite difficult to solve the following problem: "it is difficult to effectively obtain the same quality as in a state before chilling or freezing such that the item has no or substantially no discoloration or an offensive odor, or discoloration or an offensive odor has not developed or hardly developed".

Proposed in the present invention is a new refrigeration chamber and a new refrigerated item container which can effectively solve the problem that "it is difficult to effectively obtain the same quality as in a state before chilling or freezing such that an item has no or substantially no discoloration or an offensive odor, or discoloration or an offensive odor has not developed or hardly developed".

SUMMARY

A refrigeration chamber according to one aspect of the invention includes, for example: (i) a refrigeration compartment having an internal temperature that is set at an item chilling temperature or an item freezing temperature or is set at the item chilling temperature or the item freezing temperature and an item unrefrigerated storage temperature or an item thawing temperature, (ii) a catalyst-layer forming plate having a catalyst layer formed on the insulating surface of a substrate along the wall surface of the refrigeration compartment, or a catalyst layer formed on the insulating wall surface of the refrigeration compartment, (iii) the catalyst layer containing a catalyst prepared by blending photocatalyst particles and metal catalyst particles with a solution of a binder and a binder adjuvant such that the surfaces of the photocatalyst particles and the metal catalyst particles are exposed on the surface of the catalyst layer, (iv) a light source opposed to the refrigeration compartment, the light source irradiating the catalyst layer with light, and (v) an item trays disposed in the refrigeration compartment, (vi) the item trays having a conductive surface and acting as a plasma plate or having an insulating surface and having a plasma plate on the insulating surface, (vii) the refrigeration compartment containing a counter electrode plate of the plasma plate.

A refrigerated item container according to another aspect of the invention includes, for example: (i) a catalyst-layer forming plate having a catalyst layer formed on an insulating surface of a substrate along the inner wall surface of the container, or a catalyst layer formed on an insulating inner wall surface of the container, (ii) the catalyst layer containing a catalyst prepared by blending photocatalyst particles and metal catalyst particles with a solution of a binder and a binder adjuvant such that the surfaces of the photocatalyst particles and the metal catalyst particles are exposed on the surface of the catalyst layer, (iii) a light source opposed to the interior of the container, the light source irradiating the catalyst layer with light, and (iv) a plasma plate and, a counter electrode plate of the plasma plate.

According to the refrigeration chamber of one aspect of the invention, (i) an item to be preserved is chilled and the chilled item can be effectively preserved as compared with any other refrigeration chambers than thus configured exemplary refrigeration chamber according to the present invention. In the case where an item having been chilled for an extended period as an item to be preserved is unrefrigerated to a state before chilling, the item has no or substantially no discoloration or an offensive odor, and (ii) in the case where a chilled item is unrefrigerated to a state before chilling, the item in a similar condition to the state before chilling can be effectively obtained with substantially no discoloration or an offensive odor as compared with any other refrigeration chambers than thus configured exemplary refrigeration chamber according to the present invention.

(iii) An item to be preserved is frozen and the frozen item can be effectively preserved in an excellent preservation environment as compared with any other refrigeration chambers than thus configured exemplary refrigeration chamber according to the present invention. In the case where an item frozen for an extended period as an item to be preserved is thawed to a state before freezing, the item has no or substantially no discoloration, an offensive odor, or an external flow of flavor components, and (iv) in the case where a frozen item is thawed to a state before freezing, the item in a similar condition to the state before freezing can be effectively obtained with substantially no discoloration, an offensive odor, or an external flow of flavor components as compared with any other refrigeration chambers than thus configured exemplary refrigeration chamber according to the present invention. In the case of fresh fruit and fresh meat, the maturing of the items can be accelerated by plasma in chilling and freezing.

The refrigerated item container of the second invention can achieve the same effect as the refrigeration chamber of the second invention.

DETAILED DESCRIPTION OF THE PREFERRED EMBODIMENTS

A refrigeration chamber according to a first invention includes: (i) a refrigeration compartment having an internal temperature that is set at an item chilling temperature or an item freezing temperature or is set at the item chilling temperature or the item freezing temperature and at an item unrefrigerated storage temperature or an item thawing temperature, (ii) a catalyst-layer forming plate having a catalyst layer formed on an insulating surface of a substrate along the wall surface of the refrigeration compartment, or a catalyst layer formed on an insulating wall surface of the refrigeration compartment, (iii) the catalyst layer containing a catalyst prepared by blending photocatalyst particles and metal catalyst particles with a solution of a binder and a binder adjuvant such that the surfaces of the photocatalyst particles and the metal catalyst particles are exposed on the surface of the catalyst layer, (iv) a light source opposed to the refrigeration compartment, the light source irradiating the catalyst layer with light, and (v) an item trays disposed in the refrigeration compartment, (vi) the item trays having a conductive surface and acting as a plasma plate or having an insulating surface and having a plasma plate on the insulating surface, (vii) the refrigeration compartment containing a counter electrode plate of the plasma plate. By using the refrigeration chamber, an item to be preserved is chilled or frozen and the chilled or frozen item can be effectively preserved as compared with any other refrigeration chambers than the refrigeration chamber according the first invention. In the case where an item having been chilled or frozen for an extended period as an item to be preserved is unrefrigerated or thawed to a state before chilling or freezing, the item has no or substantially no discoloration or an offensive odor, or the item has no or substantially no discoloration, an offensive odor, or an external flow of flavor components (drip).

A refrigerated item container according to a second invention includes: (i) a catalyst-layer forming plate having a catalyst layer formed on an insulating surface of a substrate along the inner wall surface of the container, or a catalyst layer formed on an insulating inner wall surface of the container, (ii) the catalyst layer containing a catalyst prepared by blending photocatalyst particles and metal catalyst particles with a solution of a binder and a binder adjuvant such that the surfaces of the photocatalyst particles and the metal catalyst particles are exposed on the surface of the catalyst layer, (iii) a light source opposed to the interior of the container, the light source irradiating the catalyst layer with light, and (iv) a plasma plate and a counter electrode plate of the plasma plate. The refrigerated item container accommodating an item to be preserved is used in a refrigeration chamber, so that the item to be preserved is stored as in the refrigeration chamber of the first invention.

[First Embodiment]

Figure 1:
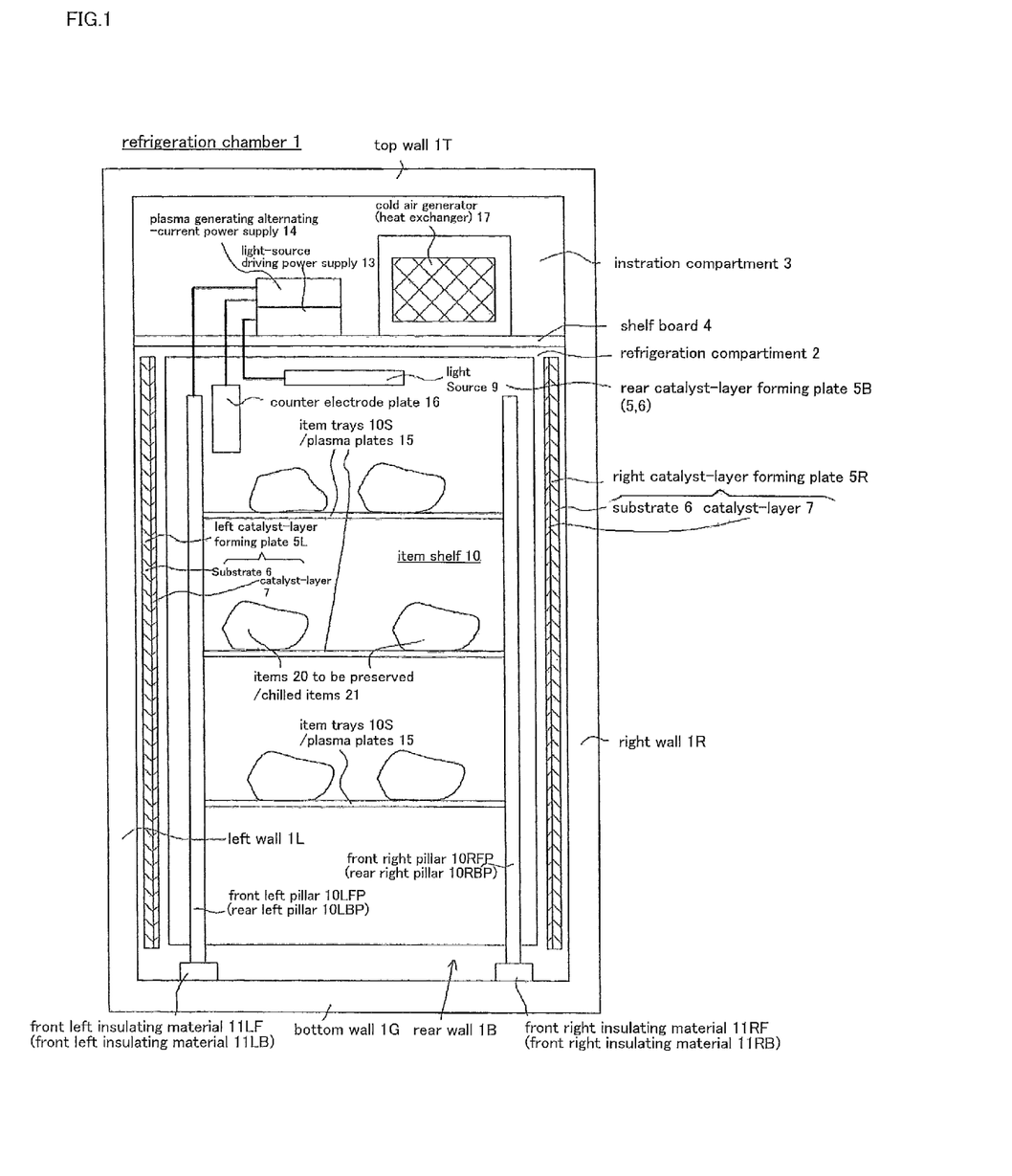
FIG. 1 is a schematic sectional view illustrating an example of a refrigeration chamber from the front door (not shown) according to the present invention.

In FIG. 1, reference numeral 1 denotes an example of the overall configuration of a refrigeration chamber according to the present invention. The refrigeration chamber 1 includes a left wall 1L, a right wall 1R, a rear wall 1B, a bottom wall 1G, a front door 1F (not shown), and a top wall 1T all of which have heat insulating properties. Between the left wall 1L and the right wall 1R, a shelf board 4 is extended so as to separate a refrigeration compartment 2 and a unit installation compartment 3 disposed on top of the refrigeration compartment 2. The shelf board 4 allows the refrigeration compartment 2 and the unit installation compartment 3 to communicate with each other at the fronts and rears of the chambers.

The refrigeration compartment 2 includes a left catalyst-layer forming plate 5L, a right catalyst-layer forming plate 5R, and a rear catalyst-layer forming plate 5B along the left wall 1L, the right wall 1R, and the rear wall 1B of the refrigeration chamber 1.

The left catalyst-layer forming plate 5L, the right catalyst-layer forming plate 5R, and the rear catalyst-layer forming plate 5B each have a catalyst layer 7 on the insulating surface of a substrate 6, and are disposed in the refrigeration compartment 2 such that the catalyst layers 7 face inward in the refrigeration compartment 2.

The catalyst layers 7 of the left catalyst-layer forming plate 5L, the right catalyst-layer forming plate 5R, and the rear catalyst-layer forming plate 5B contain a catalyst prepared by blending photocatalyst particles and metal catalyst particles with a solution of a binder and a binder adjuvant such that the surfaces of the photocatalyst particles and the metal catalyst particles are exposed on the surface of the catalyst layer.

The photocatalyst particles of the catalyst layers 7 of the left catalyst-layer forming plate 5L, the right catalyst-layer forming plate 5R, and the rear catalyst-layer forming plate 5B are particles of metal oxides selected from titanium dioxide, titanium oxide, zinc oxide, iron oxide, copper oxide, silver oxide, tungsten oxide, zirconium oxide, bismuth oxide, indium oxide, germanium oxide, nickel oxide, cobalt oxide, chromium oxide, manganese oxide, vanadium oxide, niobium oxide, antimony oxide, and strontium oxide. Desirably, titanium dioxide particles are used. Further, the metal catalyst particles are particles of metals selected from platinum, gold, silver, copper, iron, cobalt, nickel, chromium, and zinc. Desirably, platinum particles are used.

In the refrigeration compartment 2, a light source 9 such as a light-emitting diode (LED) and a fluorescent lamp is disposed along the shelf board 4 so as to face the refrigeration compartment 2. The light source 9 irradiates the catalyst layers 7 of the left catalyst-layer forming plate 5L, the right catalyst-layer forming plate 5R, and the rear catalyst-layer forming plate 5B with light to enable photocatalysis on the photocatalyst particles exposed on the surfaces of the catalyst layers 7.

In the refrigeration compartment 2, an item shelf 10 is provided that includes a pair of a front left pillar 10LFP and a rear left pillar 10LBP, a pair of a front right pillar 10RFP and a rear right pillar 10RBP, and multiple item trays 10S laterally extended while being suspended between the pair of the front left pillar 10LFP and the rear left pillar 10LBP and the pair of the front right pillar 10RFP and the rear right pillar 10RBP.

In this case, the item trays 10S of the item shelf 10 are made of a conductive material and act as plasma plates 15. The front left pillar 10LFP, the rear left pillar 10LBP, the front right pillar 10RFP, and the rear right pillar 10RBP are also made of a conductive material and are raised on the bottom wall 1G of the refrigeration chamber 1 via a front left insulating material 11LF, a rear left insulating material 11LB, a front right insulating material 11RF, a rear right insulating material 11RB, respectively.

Further, in the refrigeration compartment 2, a counter electrode plate (ground electrode plate) 16 for the plasma plates 15 acting as the item trays 10S of the item shelf 10 is disposed in an upper part of the refrigeration compartment 2 along the rear wall 1B of the refrigeration chamber 1.

In the unit installation compartment 3, a light-source driving power supply 13 and a plasma generating alternating-current power supply 14 are provided on the shelf board 4. The light-source driving power supply 13 supplies driving power supply to the light source 9 facing the refrigeration compartment 2, and the plasma generating alternating-current power supply 14 supplies plasma generating alternating-current power supply (e.g., a voltage from 1000 V to 15000 V) across the plasma plates 15 and the counter electrode plate 16. The light source 9 facing the refrigeration compartment 2 is connected to the light-source driving power supply 13. The plasma plates 15 serving as the item trays 10S of the item shelf 10 installed in the refrigeration compartment 2 are connected to the hot terminal of the plasma generating alternating-current power supply 14, and the counter electrode plate (ground electrode plate) 16 disposed in the refrigeration compartment 2 is connected to the ground terminal of the plasma generating alternating-current power supply 14.

In the unit installation compartment 3, a known cold air generator (heat exchanger) 17 is similarly disposed on the shelf board 4. The cold air generator (heat exchanger) 17 is operated to inhale air in the unit installation compartment 3 from the front side, generate cold air of a controlled temperature and a controlled flow velocity or flow rate from the air through heat exchange under various known control techniques including program control, and guide the cold air into the unit installation compartment 3 from the rear side. The cold air guided into the unit installation compartment 3 from the rear side of the cold air generator (heat exchanger) 17 passes behind the shelf board 4, spreads downward in the refrigeration compartment 2, rises and passes the front side of the shelf board 4 to return to the unit installation compartment 3, and then the cold air is inhaled into the cold air generator (heat exchanger) 17 from the front side.

An example of the refrigeration chamber according to the present invention is configured thus.

The example of the refrigeration chamber according to the present invention can achieve the following effects:

(1) Cold Storage (i) The cold air generator (heat exchanger) 17 in the unit installation compartment 3 is operated. The cold air generator (heat exchanger) 17 inhales air in the unit installation compartment 3 from the front side, generates cold air of a controlled temperature and a controlled flow velocity or flow rate from the air through controlled heat exchange, and guides the cold air into the unit installation compartment 3 from the rear side. The cold air passes behind the shelf board 4, spreads downward in the refrigeration compartment 2, rises and passes the front side of the shelf board 4 to return to the unit installation compartment 3, and then the cold air is inhaled by the cold air generator (heat exchanger) 17 from the front side. Thus a cold air current is obtained in the refrigeration compartment 1.

(ii) When or before a cold air current is obtained thus, items 20 to be preserved are loaded on the item trays 10S of the item shelf 10 installed in the refrigeration compartment 2. Normally, the items 20 are loaded after a cold air current is obtained. In this case, the items 20 to be preserved are chilled to obtain chilled items 21 and the items 20 can be stored as the chilled items 21.

(iii) In this case, the cold air generator (heat exchanger) 17 is preset to generate cold air of a controlled temperature and a controlled flow velocity or flow rate to exit from the rear side, so that the cold air has a predetermined temperature (normally, from 13° C. to −5° C.) in the refrigeration compartment 2. Thus the items 20 to be preserved can be chilled at or around the predetermined temperature, so that the items 21 chilled at or around the predetermined temperature can be obtained from the items 20. The items 20 to be preserved can be stored as the chilled items 21.

(iv) When the items 20 to be preserved are loaded on the item trays 10S of the item shelf 10, the plasma generating alternating-current power supply 14 is operated. At this moment, plasma is generated that oscillates between the counter electrode plate 16 disposed in the refrigeration compartment 2 and the plasma plates 15 serving as the item trays 10S of the item shelf 10 installed in the refrigeration compartment 2, an oscillatory electric field is generated in the refrigeration compartment 2 in response to the generation of plasma, and ozone and negative ions are generated. Thus assuming that the items 20 to be preserved are loaded on the item trays 10S serving as the plasma plates 15 of the item shelf 10 installed in the refrigeration compartment 2 and the items 20 to be preserved are chilled, the chilled items 20 to be preserved are exposed to the oscillatory electric field generated in response to the generated plasma, the items 20 are subjected to internal microvibrations due to the oscillatory electric field, and the items 20 are exposed to ozone and negative ions. Thus the chilled items 20 to be preserved are activated.

(v) Further, the left catalyst-layer forming plate 5L, the right catalyst-layer forming plate 5R, and the rear catalyst-layer forming plate 5B are provided in the refrigeration compartment 2 and metal catalyst particles are exposed on the surfaces of the catalyst layers 6. Assuming that the items 20 to be preserved are chilled and organic compounds (composed of H, C, and O) causing discoloration and an offensive odor on the items 20 are present around the chilled items 20 to be preserved, the metal catalyst particles exposed on the surfaces of the catalyst layers 6 adsorb the molecules of the organic compounds around the items 20 to be preserved and decompose the molecules into atomic particles (H, C, and O particles). Further, the atomic particles are caused to adhere to metal catalyst particles 8. Prior to the adhesion, the light-source driving power supply 13 is started. At this moment, light is emitted in the refrigeration compartment 2 from the light source 9. The light is emitted to the catalyst layers 6 of the left catalyst-layer forming plate 5L, the right catalyst-layer forming plate 5R, and the rear catalyst-layer forming plate 5B, so that the photocatalyst particles exposed on the surfaces of the catalyst layers 6 are irradiated with the light. Thus oxygen in air around the chilled items 20 to be preserved in the refrigeration compartment 2 is decomposed to generate active oxygen. The active oxygen is bound to the atomic particles that are obtained by decomposing the organic compound molecules and are caused to adhere to the metal catalyst particles, so that molecules of carbonic acid gas ($CO_2$) or water ($H_2O$) are generated. Therefore, the catalyst layers 6 of the left catalyst-layer forming plate 5L, the right catalyst-layer forming plate 5R, and the rear catalyst-layer forming plate 5B can achieve a catalytic action that eliminates organic compounds around the chilled items 20 to be preserved, the organic compounds causing discoloration and an offensive odor on the items 20 to be preserved.

(vi) As described in (iv), ozone and negative ions are generated in the refrigeration compartment 2. Further, the catalytic action obtained as in (v) can bring the inside of the refrigeration compartment 2 in an antibacterial state, a bacteriostatic state, and an sterilized state, so that the items 20 to be preserved can be preserved as the chilled items 21 of (iii) in an excellent storage environment for an extended period.

(vii) Moreover, in the case where the predetermined temperature (normally, 30° C. to −5° C.) in (iii) is set at or below the freezing point (0° C.) in a predetermined temperature range, frozen crystals are generated in the items 20 to be preserved and increase the volumes of the items 20 to be preserved, which may generate organic compounds causing discoloration and an offensive odor on the items 20 to be preserved, and cause cytoclasis or cellular/molecule sequence distortion resulting in an external flow of flavor components. However, the occurrence of organic compounds, cytoclasis, and cellular/molecule sequence distortion can be effectively suppressed by internal microvibrations in the items 20 to be preserved, the internal microvibrations being caused by an oscillatory electric field as described in (iv).

(viii) As has been discussed, the catalytic action of (v) is obtained by irradiating the catalyst layers 6 of the left catalyst-layer forming plate 4L, the right catalyst-layer forming plate 4R, and the rear catalyst-layer forming plate 4B with light from the light source 9, the light being emitted to the photocatalyst particles exposed on the surfaces of the catalyst layers 6. At this moment, the plasma in (iv) is emitted to the catalyst layers 6 of the left catalyst-layer forming plate 4L, the right catalyst-layer forming plate 4R, and the rear catalyst-layer forming plate 4B, and accordingly the plasma is emitted to the photocatalyst particles exposed on the surfaces of the catalyst layers 6 to accelerate the catalytic action. Thus the power of the light-source driving power supply 13 for operating the light source 9 can be effectively reduced.

(ix) As has been discussed, in the example of the refrigeration chamber configured thus according to the present invention, the items 20 to be preserved are chilled to obtain the chilled items 21 and the chilled items 21 can be effectively preserved in an excellent preservation environment as compared with any other refrigeration chambers than thus configured exemplary refrigeration chamber according to the present invention. As will be described in "(2) Unrefrigerated Storage", in the case where the chilled item 21 having been refrigerated for an extended period as the item 20 to be preserved is unrefrigerated to obtain the same quality as in a state before chilling, the item has no or substantially no discoloration, an offensive odor, or an external flow of flavor components.

(2) Unrefrigerated Storage (i) In a state in which a cold air current is obtained in the refrigeration compartment 2 by operating the cold air generator (heat exchanger) 17 in the unit installation compartment 3 as described in "(1) Cold Storage" (i), the cold air generator 17 is set to generate air of a controlled temperature and a controlled flow velocity or flow rate to exit from the rear, so that the air has a predetermined unrefrigerated storage temperature (e.g., increased by 20° C.) in the refrigeration compartment 2. Thus an air current at or around the predetermined unrefrigerated storage temperature can be obtained in the refrigeration compartment 2, and the chilled items 21 can be unrefrigerated at or around the predetermined unrefrigerated storage temperature. Hence, the chilled items 21 can be refrigerated to a state before chilling, that is, to the items 20 to be preserved in the refrigeration compartment 2 of the refrigeration chamber 1. In this case, by continuously operating the plasma generating alternating-current power supply 14 as described in "(1) Cold Storage" (iv), an oscillatory electric field, ozone, and negative ions are generated as in "(1) Cold Storage" (iv) by plasma occurring between the counter electrode plates 16 disposed in the refrigeration compartment 2 and the plasma plates 15 serving as the item trays 10S of the item shelf 10 installed in the refrigeration compartment 2, and the chilled items 21 on the item trays 10S serving as the plasma plates 15 of the item shelf 10 are exposed to the oscillatory electric field, is subjected to internal microvibrations by the oscillatory electric field, and is exposed to ozone and negative ions. Thus the chilled items 21 are activated.

(ii) In the presence of organic compounds causing discoloration and an offensive odor on the chilled items 21 as described in "(1) Cold Storage" (v), the molecules of the organic compounds are adsorbed by the metal catalyst particles exposed on the surfaces of the catalyst layers 6 of the left catalyst-layer forming plate 5L, the right catalyst-layer forming plate 5R, and the rear catalyst-layer forming plate 5B in the refrigeration compartment 2, and then the molecules are decomposed into atomic particles as described in "(1) Cold Storage" (v). The atomic particles are caused to adhere to the metal catalyst particles 8. As described in "(1) Cold Storage" (v), by continuously operating the light-source driving power supply 13, light is emitted in the refrigeration compartment 2 from the light source 9 as in "(1) Cold Storage" (v), and the light is emitted to the catalyst layers 6 of the left catalyst-layer forming plate 5L the right catalyst-layer forming plate 5R, and the rear catalyst-layer forming plate 5B, so that the photocatalyst particles exposed on the surfaces of the catalyst layers 6 are irradiated with the light. Thus oxygen in air around the chilled items 21 is decomposed to generate active oxygen. The active oxygen is bound to the atomic particles that are obtained by decomposing the organic compound molecules and are caused to adhere to the metal catalyst particles, so that molecules of carbonic acid gas ($CO_2$) or water ($H_2O$) are generated. Therefore, as described in "(1) Cold Storage" (v), the catalyst layers 6 of the left catalyst-layer forming plate 5L, the right catalyst-layer forming plate 5R, and the rear catalyst-layer forming plate 5B can achieve a catalytic action that eliminates organic compounds around the chilled items 21, the organic compounds causing discoloration and an offensive odor on the chilled items 21.

(iii) As described in "(1) Cold Storage" (vii), the predetermined temperature is set at or below the freezing point, frozen crystals are generated in the chilled items 21, which may generate organic compounds causing discoloration and an offensive odor on the chilled items 21 and cause cytoclasis or cellular/molecule sequence distortion resulting in an external flow of flavor components. However, the occurrence of organic compounds, cytoclasis, and cellular/molecule sequence distortion can be effectively suppressed by microvibrations in the chilled items as described in (ii).

(iv) In the case where the catalytic action of (iii) is obtained by irradiating the photocatalyst particles of the catalyst layers 6 of the left catalyst-layer forming plate 4L, the right catalyst-layer forming plate 4R, and the rear catalyst-layer forming plate 4B with light from the light source 9 as discussed in (iii), the plasma described in "(1) Cold Storage" (iv) can effectively reduce the power of the light-source driving power supply 13 for operating the light source 9, for the reason described in "(1) Cold Storage" (viii).

(v) For these reasons, in the example of the refrigeration chamber configured thus according to the present invention, the items 20 can be effectively obtained from the chilled items 21 with the same quality as in a state before chilling with substantially no discoloration or an offensive odor as compared with any other refrigeration chambers than thus configured exemplary refrigeration chamber according to the present invention.

(3) Frozen Storage (i) As in "(1) Cold Storage" (i), the cold air generator (heat exchanger) 17 in the unit installation compartment 3 is operated to obtain a cold air current in the refrigeration compartment 2. Before or after the cold air current is obtained, the items 20 to be preserved are loaded on the item trays 10S of the item shelf 10 installed in the refrigeration compartment 2, as described in "(1) Cold Storage" (ii). Further, as described in "(1) Cold Storage", the cold air generator (heat exchanger) 17 is set to generate cold air of a controlled temperature and a controlled flow velocity or flow rate to exit from the rear side, so that the cold air has a predetermined temperature (normally, −15° C. to −25° C.) in the refrigeration compartment 2. Thus according to "(1) Cold Storage" (iii), the items 20 to be preserved can be frozen at or around a predetermined freezing temperature, so that the frozen items 21 at or around the predetermined freezing temperature can be obtained from the items 20 to be preserved, and the frozen items 21 can be stored as the items 20 to be preserved.

(ii) In this case, by operating the plasma generating alternating-current power supply 14 as described in "(1) Cold Storage" (iv), plasma is generated between the counter electrode plate 16 disposed in the refrigeration compartment 2 and the plasma plates 15 serving as the item trays 10S of the item shelf 10 installed in the refrigeration compartment 2, an oscillatory electric field is generated in the refrigeration compartment 2 in response to the generation of plasma, and ozone and negative ions are generated. Thus assuming that the items 20 to be preserved are loaded on the item trays 10S serving as the plasma plates 15 of the item shelf 10 installed in the refrigeration compartment 2, the frozen items 20 to be preserved are exposed to an oscillatory electric field generated in response to the generated plasma, are subjected to internal microvibrations due to the oscillatory electric field, and are exposed to ozone and negative ions as described in "(1) Cold Storage" (iv). Thus the frozen items 20 to be preserved are activated.

(iii) As in "(1) Cold Storage" (v), the left catalyst-layer forming plate 5L, the right catalyst-layer forming plate 5R, and the rear catalyst-layer forming plate 5B are provided in the refrigeration compartment 2 and the metal catalyst particles are exposed on the surfaces of the catalyst layers 6. Assuming that the items 20 to be preserved are frozen as in (i) and organic compounds causing discoloration and an offensive odor on the items 20 to be preserved are present, as described in "(1) Cold Storage (v)", around the frozen items 20 to be preserved, the metal catalyst particles exposed on the surfaces of the catalyst layers 6 adsorb the molecules of the organic compounds around the items 20 to be preserved and decompose the molecules into atomic particles, and the atomic particles are caused to adhere to the metal catalyst particles 8 as described in "(1) Cold Storage" (v). At this moment, as in "(1) Cold Storage" (v), by starting the light-source driving power supply 13, light is emitted in the refrigeration compartment 2 from the light source 9. The light is emitted to the catalyst layers 6 of the left catalyst-layer forming plate 5L, the right catalyst-layer forming plate 5R, and the rear catalyst-layer forming plate 5B, so that the photocatalyst particles exposed on the surfaces of the catalyst layers 6 are irradiated with the light. Oxygen in air around the frozen items 20 to be preserved in the refrigeration compliment 2 is decomposed to generate active oxygen. The active oxygen is bound to the atomic particles that are obtained by decomposing the organic compound molecules and are caused to adhere to the metal catalyst particles, so that molecules of carbonic acid gas ($CO_2$) or water ($H_2O$) are generated. It is therefore possible to obtain a catalytic action that eliminates organic compounds around the frozen items 20 to be preserved, the organic compounds causing discoloration and an offensive odor on the frozen items 20 to be preserved.

(iv) As described in (ii), ozone and negative ions are generated in the refrigeration compartment 2. Further, the catalytic action obtained as in (iii) can bring the inside of the refrigeration compartment 2 in an antibacterial state, a bacteriostatic state, and an sterilized state as in "(1) Cold Storage" (vi), so that the items 20 to be preserved can be preserved as the frozen items 21 of (i) in an excellent storage environment for an extended period.

(v) As described in (ii), the frozen items 20 to be preserved are exposed to an oscillatory electric field generated in response to the generation of plasma and are subjected to internal microvibrations due to the oscillatory electric field. Thus as described in "(1) Cold Storage" (vii), when the frozen items 20 to be preserved are set at or lower than the freezing temperature (0° C.), frozen crystals are generated in the items 20 due to moisture in the items 20 and increase the volumes of the frozen items 20 to be preserved, which may generate organic compounds causing discoloration and an offensive odor on the frozen items 20 to be preserved and cause cytoclasis or cellular/molecule sequence distortion resulting in an external flow of flavor components. However, the occurrence of organic compounds, cytoclasis, and cellular/molecule sequence distortion can be effectively suppressed.

(vi) As described in (iii), the catalytic action of (iii) is obtained by irradiating the catalyst layers 6 of the left catalyst-layer forming plate 5L, the right catalyst-layer forming plate 5R, and the rear catalyst-layer forming plate 5B with light from the light source 9, so that the photocatalyst particles exposed on the surfaces of the catalyst layers 6 are irradiated with the light. As in "(1) Cold Storage" (viii), the plasma generated as described in (ii) is emitted to the catalyst layers 6 of the left catalyst-layer forming plate 5L, the right catalyst-layer forming plate 5R, and the rear catalyst-layer forming plate 5B, and accordingly the plasma is emitted to the photocatalyst particles exposed on the surfaces of the catalyst layers 6 to accelerate the catalytic action. Thus the power of the light-source driving power supply 13 for operating the light source 9 can be effectively reduced.

(vii) As has been discussed, in the example of the refrigeration chamber configured thus according to the present invention, the items 20 to be preserved are frozen to obtain the frozen items 21 according to "(1) Cold Storage" (ix) and the frozen items 21 can be effectively preserved in an excellent preservation environment as compared with any other refrigeration chambers than thus configured exemplary refrigeration chamber according to the present invention. As will be described in "(4) Thawing", in the case where the frozen item 21 preserved as the item 20 to be preserved is thawed to obtain the same quality as in a state before freezing, the item has no or substantially no discoloration, an offensive odor, or an external flow of flavor components.

(4) "(2) Thawing"

(i) In a state in which a cold air current is obtained in the refrigeration compartment 2 by operating the cold air generator (heat exchanger) 17 in the unit installation compartment 3 according to "(3) Unrefrigerated Storage" (i), the cold air generator (heat exchanger) 17 in the unit installation compartment 3 is set to generate air of a controlled temperature and a controlled flow velocity or flow rate to exit from the rear, so that the air has a predetermined thawing temperature (e.g., increased by 20° C.) in the refrigeration compartment 2. Thus according to "(2) Unrefrigerated Storage" (i), the frozen items 21 can be thawed to or around the predetermined thawing temperature, so that the frozen items 21 can be thawed to a state before freezing, that is, a state before the items 20 to be preserved are stored in the refrigeration compartment 2 of the refrigeration chamber 1. In this case, by continuously operating the plasma generating alternating-current power supply 14 as described in "(3) Frozen Storage" (iv), an oscillatory electric field, ozone, and negative ions are generated according to "(2) Unrefrigerated Storage" (ii) by plasma occurring between the counter electrode plates 16 and the plasma plates 15, and the frozen items 21 on the item trays 10S of the item shelf 10 are exposed to the oscillatory electric field, are subjected to internal microvibrations by the oscillatory electric field, and are exposed to ozone and negative ions. Thus the frozen items 21 are activated.

(ii) In the presence of organic compounds causing discoloration and an offensive odor on the frozen items 21, the molecules of the organic compounds are adsorbed by the metal catalyst particles exposed on the surfaces of the catalyst layers 6 of the left catalyst-layer forming plate 5L, the right catalyst-layer forming plate 5R, and the rear catalyst-layer forming plate 5B in the refrigeration compartment 2 according to "(2) Unrefrigerated Storage" (iii), and then the molecules are decomposed into atomic particles. The atomic particles are caused to adhere to the metal catalyst particles 8. As described in "(3) Cold Storage" (v), by continuously operating the light-source driving power supply 13, light is emitted in the refrigeration compartment 2 from the light source 9 according to "(2) Unrefrigerated Storage" (iii), and the light is emitted to the catalyst layers 6 of the left catalyst-layer forming plate 5L, the right catalyst-layer forming plate 5R, and the rear catalyst-layer forming plate 5B, so that the photocatalyst particles exposed on the surfaces of the catalyst layers 6 are irradiated with the light. Thus oxygen in air around the frozen items 21 is decomposed to generate active oxygen. The active oxygen is bound to the atomic particles that are obtained by decomposing the organic compound molecules and are caused to adhere to the metal catalyst particles, so that molecules of carbonic acid gas ($CO_2$) or water ($H_2O$) are generated. It is therefore possible to achieve a catalytic action that eliminates organic compounds around the frozen items 21 in an antibacterial state, a bacteriostatic state, and a sterilized state, the organic compounds causing discoloration and an offensive odor on the frozen items 21.

(iii) As described in "Cold Storage" (vii), when the predetermined temperature is set at or lower than the freezing temperature, frozen crystals are generated in the chilled items 21 according to "(1) Cold Storage" (vii), which may generate organic compounds causing discoloration and an offensive odor on the chilled items 21 and cause cytoclasis or cellular/molecule sequence distortion resulting in an external flow of flavor components. However, the occurrence of organic compounds, cytoclasis, and cellular/molecule sequence distortion can be effectively suppressed by internal microvibrations of the chilled items as described in (ii).

(iv) In the case where the catalytic action of (iii) is obtained by irradiating the photocatalyst particles on the catalyst layers 6 of the left catalyst-layer forming plate 5L, the right catalyst-layer forming plate 5R, and the rear catalyst-layer forming plate 5B with light from the light source 9 as described in (iii), the generation of plasma described in "(1) Cold Storage" (iv) can effectively reduce the power of the light-source driving power supply 13 for operating the light source 9 for the reason described in "(1) Cold Storage" (viii).

(v) In the example of the refrigeration chamber configured thus according to the present invention, the items 20 to be preserved can be effectively obtained from the frozen items 21 as in a state before freezing, with substantially no discoloration, an offensive odor, or an external flow of flavor components as compared with any other refrigeration chambers than thus configured exemplary refrigeration chamber according to the present invention.

[Second Embodiment]

Figure 2:
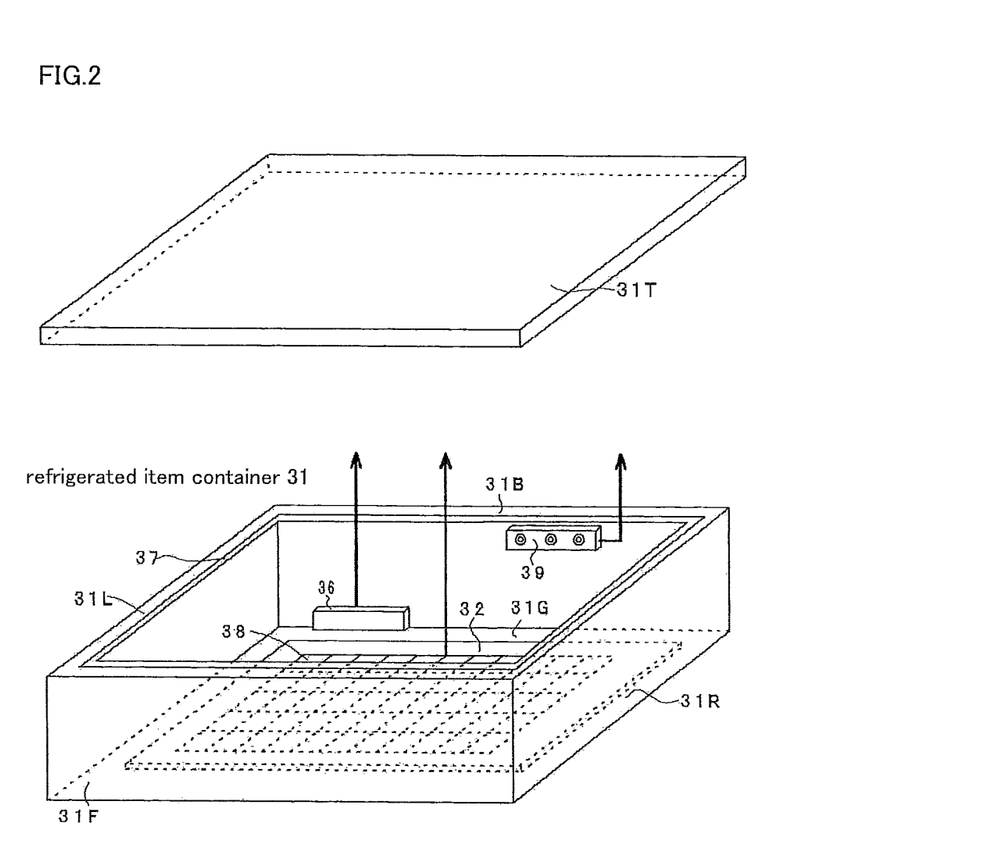
FIG. 2 is a schematic perspective view showing an example of a refrigerated item container according to the present invention.

In FIG. 2, reference numeral 31 denotes an example of the overall configuration of a refrigerated item container according to the present invention. The refrigerated item container 31 is made of, e.g., an insulating resin material and includes a front plate 31F, a left plate 31L, a right plate 31R, a rear plate 31B, a bottom plate 31G, and a cover plate 1T which are all insulating plates. On the insulating inner wall surfaces of the front plate 31F, the left plate 31L, the right plate 31R, and the rear plate 31B, a catalyst layer 37 is formed that is configured as the catalyst layer 7 on the insulating surface of the substrate 6 that constitutes the left catalyst-layer forming plate 5L, the right catalyst-layer forming plate 5R, and the rear catalyst-layer forming plate 5B in the refrigeration compartment 2 of the refrigeration chamber 1 described in the first embodiment.

On the bottom plate 31G of the refrigerated item container 31, an insulating substrate 32 is provided. On the insulating substrate 32, a plasma plate 38 is formed with, e.g., a mesh pattern.

In the refrigerated item container 31, a counter electrode plate 36 for the plasma plate 38 is provided along the lower side of the rear plate 31B. In the upper part of the rear plate 31B, a light source 39 such as a light-emitting diode (LED) and a fluorescent lamp is provided which emits light enabling photocatalyst on particles exposed on the surface of the catalyst layer 37.

The example of the refrigerated item container according to the present invention is configured thus.

In the refrigerated item container 31 configured thus according to the present invention, an item 20 to be preserved is stored on the plasma plate 38 in the refrigerated item container 31. In a state in which a refrigeration compartment and a unit installation compartment are provided that are identical to the refrigeration compartment 2 and the unit installation compartment 3 of the refrigeration chamber 1 shown in FIG. 1, the refrigerated item container 31 is disposed on an item tray of an item shelf in the refrigeration chamber. The item shelf is identical to the item shelf 10 installed in the refrigeration compartment 2 shown in FIG. 1 and includes item trays suspended between pillars. The pillars may be nonconductive. The item trays may not act as plasma plates. The catalyst layer 37 of the refrigerated item container 31 corresponds to the catalyst layer 7 of the catalyst-layer forming plate disposed in the refrigeration compartment 2 of the refrigeration chamber 1 shown in FIG. 1, the plasma plate 38 corresponds to the plasma plate acting as the item trays of the item shelf 10 installed in the refrigeration compartment 2 of the refrigeration chamber 1 shown in FIG. 1, the counter electrode plate corresponds to the counter electrode plate 16 disposed in the refrigeration compartment 2 of the refrigeration chamber 1 shown in FIG. 1, and the light source 39 corresponds to the light source 9 facing the refrigeration compartment 2 of the refrigeration chamber 1 shown in FIG. 1, thereby achieving the same effect as the cold storage, unrefrigerated storage, frozen storage, and thawing of the refrigeration chamber shown in FIG. 1.

[Modifications]

The examples of the refrigeration chamber and the refrigerated item container are merely exemplary. In the refrigeration chamber of FIG. 1 according to the present invention, the refrigeration compartment 2 may have insulating wall surfaces including catalyst layers identical to the catalyst layers 7 of the catalyst-layer forming plates 5L, 5R, and 5B, instead of forming the catalyst-layer forming plates 5L, 5R, and 5B along the wall surfaces of the refrigeration compartment 2. Further, instead of causing the conductive item trays 10S of the item shelf 10 installed in the refrigeration compartment 2 to act as the plasma plates 15, the item trays 10S may have insulating surfaces including plasma electrode layers. In the refrigerated item container of FIG. 2, the container may have an inner insulating surface and catalyst-layer forming plates may be provided on the inner insulating surface of the substrate. It is believed obvious that various other modifications and changes are possible.

The refrigeration chamber and the refrigerated item container of the present invention are widely applicable not only to industrial use but also household use.

What is claimed is:

1. A refrigeration chamber for chilling or freezing items to be preserved, the refrigeration chamber comprising:
   a shelf board separating the refrigeration chamber into a lower refrigeration compartment and an upper unit installation compartment, the shelf board positioned to define a front communicating portion along the front side of the shelf board and a rear communication portion along the rear side of the shelf board, the front and rear communicating portions configured to guide airflow to pass in front of and behind the shelf board, respectively, to facilitate airflow communication between the refrigeration compartment and the unit installation compartment;
   a cold air generator disposed on the shelf board in the unit installation compartment, the cold air generator configured to inhale air into the unit installation compartment and to generate and supply cold air, in which the supplied cold air is guided downwards into the refrigeration compartment either in front of or behind the shelf board, via one of the front and rear communicating portions, respectively, and then guided to return back to the unit installation compartment either in front of or behind the shelf board via the other of the front and rear communicating portions, respectively;
   a catalyst-layer forming plate having a catalyst layer formed on the insulating surface of a substrate along the wall surface of the refrigeration compartment, or a catalyst layer formed on the insulating wall surface of the refrigeration compartment;
   a light source disposed in the refrigeration compartment, the light source irradiating the catalyst layer with light;
   a light-source driving power supply disposed on the shelf board in the unit installation compartment, the light-source driving power supply supplying driving power to the light source;
   a plurality of item trays disposed in the refrigeration compartment that are configured to operate as plasma plates, the plurality of item trays being arranged to include a conductive surface that operates as a plasma plate or include an insulating surface having a plasma plate disposed thereon;
   a counter electrode plate of a plurality of the plasma plates, the counter electrode plate being separated from the item trays; and
   a plasma generating power supply disposed on the shelf board in the unit installation compartment, the plasma generating power supply supplying plasma generating power to across the plurality of plasma plates and the counter electrode plate,
   wherein the catalyst layer contains a catalyst prepared by blending photocatalyst particles and metal catalyst particles with a solution of a binder and a binder adjuvant such that the surfaces of the photocatalyst particles and the metal catalyst particles are exposed on the surface of the catalyst layer, and
   wherein the counter electrode plate is disposed above the item trays so as to expose one or more items on the item trays to ozone and/or negative ions produced in response to the generation of plasma.

* * * * *